(12) United States Patent
Kong et al.

(10) Patent No.: US 10,821,807 B2
(45) Date of Patent: Nov. 3, 2020

(54) METHOD FOR CONTROLLING AIR CONDITIONER OF VEHICLE

(71) Applicant: HYUNDAI MOBIS CO., LTD., Seoul (KR)

(72) Inventors: Tae Yun Kong, Yongin-si (KR); Seong Hyeon Kim, Yongin-si (KR); Chung Young Kim, Yongin-si (KR); Ki Yeong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 173 days.

(21) Appl. No.: 16/020,768

(22) Filed: Jun. 27, 2018

(65) Prior Publication Data

US 2019/0047358 A1 Feb. 14, 2019

(30) Foreign Application Priority Data

Aug. 11, 2017 (KR) .......................... 10-2017-0102258

(51) Int. Cl.
*B60H 1/00* (2006.01)

(52) U.S. Cl.
CPC ......... *B60H 1/00835* (2013.01); *B60H 1/008* (2013.01); *B60H 1/00021* (2013.01); *B60H 1/00742* (2013.01); *B60H 1/00792* (2013.01); *B60H 1/00849* (2013.01); *B60H 2001/0015* (2013.01); *B60H 2001/00085* (2013.01); *B60H 2001/00092* (2013.01)

(58) Field of Classification Search
CPC ............ B60H 1/00835; B60H 1/00021; B60H 1/00792
USPC .................................................. 454/69–165
See application file for complete search history.

(56) References Cited

U.S. PATENT DOCUMENTS

| | | | |
|---|---|---|---|
| 2006/0030253 A1* | 2/2006 | Asai ....................... | B60H 1/008 454/75 |
| 2014/0087644 A1* | 3/2014 | Watanabe .......... | B60H 1/00785 454/75 |
| 2015/0017900 A1* | 1/2015 | Baek ................. | B60H 1/00742 454/75 |

FOREIGN PATENT DOCUMENTS

| | | |
|---|---|---|
| DE | 112012005506 T5 | 3/2015 |
| JP | 2009-126218 A | 6/2009 |
| JP | 2016-30564 A | 3/2016 |

(Continued)

OTHER PUBLICATIONS

Office Action of corresponding Korean Patent Application No. 10-2017-0102258—4 pages (dated Sep. 14, 2018).

*Primary Examiner* — Vivek K Shirsat
(74) *Attorney, Agent, or Firm* — Knobbe Martens Olson & Bear LLP

(57) ABSTRACT

The present invention relates to a method for controlling an air conditioner for a vehicle, which includes a blower having a structure divided into a plurality of inlets and a plurality of outlets. The method may include: detecting or predicting, by a controller, one or more of an inside temperature of the vehicle, an outside temperature, a temperature of an engine serving as a heating source, an indoor humidity of the vehicle, $CO_2$ concentration and rear seat passenger information; and comprehensively determining, by the controller, an outdoor state of the vehicle, an indoor state of the vehicle and a user's intention based on the detected or predicted information and a blower setting mode, and controlling an inlet door of the air conditioner according to one of a plurality of designated steps.

5 Claims, 10 Drawing Sheets

(56) References Cited

FOREIGN PATENT DOCUMENTS

| JP | 2016-30565 | A | 3/2016 |
|----|-----------|---|--------|
| KR | 10-0350950 | B1 | 8/2002 |
| KR | 10-0842210 | B1 | 6/2008 |
| KR | 10-2014-0084642 | A | 7/2014 |
| KR | 10-1664684 | B1 | 10/2016 |
| KR | 10-2017-0012821 | A | 2/2017 |

* cited by examiner

FIG. 4

| Door Control | #1 | #2 | #3 | #4 | #5 |
|---|---|---|---|---|---|
| Top | Outdoor Air | Outdoor Air | Outdoor Air > Indoor Air | Outdoor Air ≤ Indoor Air | Indoor Air |
| Bottom | Outdoor Air | Indoor Air | Indoor Air | Indoor Air | Indoor Air |

METHOD FOR CONTROLLING AIR CONDITIONER OF VEHICLE

CROSS-REFERENCES TO RELATED APPLICATIONS

The present application claims priority to Korean application number 10-2017-0102258, filed on Aug. 11, 2017, which is incorporated by reference in its entirety.

BACKGROUND OF THE INVENTION

The present invention relates to a method for controlling an air conditioner of a vehicle, using a blower with a 2-layer structure, and more particularly, to a method for controlling an air conditioner for a vehicle, which can control an inlet door of a blower in a stepwise manner according to a detailed heating state, thereby increasing the average indoor temperature and improving the thermal sensation of the upper body of a passenger, which was not satisfactory in an existing method for controlling an air conditioner using a blower with a 2-layer structure.

In general, most vehicles have an air conditioner installed therein.

The air conditioner of the vehicle includes an air cooler which introduces cool air into the vehicle through a blower fan of a blower (or blower module) in order to cool down the inside of the vehicle, and a heater which introduces hot air into the vehicle through the blower fan of the blower in order to heat the inside of the vehicle.

Recently, in order to improve defog performance as well as heating performance during heating, research has been conducted on a method for applying a blower to a blower fan with a 2-layer structure, the blower serving to separate or mix indoor air and outdoor air which are introduced through separate air flow paths.

In particular, research has been conducted on a method capable of reducing power consumption or improving fuel efficiency while providing better heating performance than the existing methods.

The related art is disclosed in Korean Patent Publication No. 10-2017-0012821 published on Feb. 3, 2017, and entitled "Air conditioner for vehicle".

SUMMARY OF THE INVENTION

Embodiments of the present invention are directed to a method for controlling an air conditioner of a vehicle, which can improve heating performance by controlling the air conditioner using a blower with a 2-layer structure, suppress condensation of moisture on a window, and control indoor $CO_2$ concentration (ventilation) of the vehicle.

In one embodiment, there is provided a method for controlling an air conditioner for a vehicle, which includes a blower having a structure divided into a plurality of inlets and a plurality of outlets. The method may include: detecting or predicting, by a controller, one or more of an inside temperature of the vehicle, an outside temperature, a temperature of an engine serving as a heating source, an indoor humidity of the vehicle, $CO_2$ concentration and rear seat passenger information; and comprehensively determining, by the controller, an outdoor state of the vehicle, an indoor state of the vehicle and a user's intention based on the detected or predicted information and a blower setting mode, and controlling an inlet door of the air conditioner according to one of a plurality of designated steps.

The heating state may include one or more of outdoor air setting, an extreme cold state, temperature setting for the outside temperature, maximum heating setting and a rear seat passenger state.

The plurality of designated steps may include: a first step in which outdoor air is introduced and discharged through the top and bottom of a blower fan; a second step in which only outdoor air is introduced and discharged through the top of the blower fan and only indoor air is introduced and discharged through the bottom of the blower fan; a third step in which an air mixture of outdoor air and indoor air is introduced and discharged through the top of the blower fan and only indoor air is introduced and discharged through the bottom of the blower fan, wherein the ratio of the outdoor air in the air mixture is larger than the ratio of the indoor air (outdoor air>indoor air); a fourth step in which an air mixture of outdoor air and indoor air is introduced and discharged through the top of the blower fan and only indoor air is introduced and discharged through the bottom of the blower fan, wherein the ratio of the indoor air in the mixture is equal to or larger than the ratio of the outdoor air (outdoor air indoor air); and a fifth step in which indoor air is introduced and discharged through the top and bottom of the blower fan.

In the third and fourth steps in which indoor air is additionally introduced through an upper flow path in order to improve heating efficiency of a front or rear seat, the controller may adjust the amount of indoor air which is additionally introduced when the air mixture of the outdoor air and the indoor air is discharged through the top of the blower fan, and control a designated inlet door such that heated air is mainly sent to the front seat or transferred to the rear seat.

The method may further include checking intake setting, an extreme cold condition, whether a preset temperature is higher than the outside temperature (preset temperature>outside temperature), and the maximum heating setting. When the current heating state corresponds to the maximum heating setting, the controller may check whether a passenger is seated on the rear seat, and control the inlet door according to the third step in which the air mixture of the outdoor air and the indoor air is introduced and discharged through the top of the blower fan and only the indoor air is introduced and discharged through the bottom of the blower fan, when the passenger is seated on the rear seat, wherein the ratio of the outdoor air in the air mixture is larger than the ratio of the indoor air (outdoor air>indoor air).

The controller may check whether the passenger is seated on the rear seat, using one or more of whether a rear seat belt is fastened, whether a seating pressure sensor signal is detected, whether a child seat sensor signal is detected, whether the passenger is seated on the rear seat through a separate infrared sensor, whether a rear seat window switch is adjusted, and whether the rear seat is adjusted.

The controller may check whether a passenger is seated on the rear seat, and controls the inlet door according to the fourth step in which the air mixture of the outdoor air and the indoor air is introduced and discharged through the top of the blower fan and only the indoor air is introduced and discharged through the bottom of the blower fan, when no passenger is seated on the rear seat, wherein the ratio of the indoor air in the air mixture is equal to or larger than the ratio of the outdoor air (outdoor air indoor air).

In the controlling of the inlet door of the air conditioner according to one of the plurality of designated steps, the controller may additionally perform ADS (Auto Defog System) control and $CO_2$ concentration control at the other steps excluding the first step in which the outdoor air is introduced and discharged through the top and bottom of the blower fan.

In the controlling of the inlet door of the air conditioner according to one of the plurality of designated steps, the controller may perform the fourth step to improve heating efficiency of the front seat, using the characteristic of the indoor air circulating in the vehicle.

In another embodiment, there is provided a method for controlling an air conditioner for a vehicle, which includes a blower having a structure divided into a plurality of inlets and a plurality of outlets. The method may include: checking, by a controller, whether a passenger is seated on a rear seat, when the vehicle is heated; and controlling, by the controller, an inlet door by introducing and discharging indoor air through the bottom of a blower fan and introducing and discharging an air mixture of outdoor air and indoor air through the top of the blower fan, in order to improve heating efficiency of the rear seat when the passenger is seated on the rear seat, wherein the amount of outdoor air in the air mixture is larger than the amount of indoor air. Partial indoor air which is a part of the indoor air moved with the flow of the outdoor air may be transferred to the rear seat in order to improve heating efficiency of the rear seat.

In another embodiment, there is provided a method for controlling an air conditioner for a vehicle, which includes a blower having a structure divided into a plurality of inlets and a plurality of outlets. The method may include: checking, by a controller, whether a passenger is seated on a rear seat, when the vehicle is heated; and controlling, by the controller, an inlet door by introducing and discharging indoor air through the bottom of a blower fan and introducing and discharging an air mixture of outdoor air and indoor air through the top of the blower fan, in order to improve heating efficiency of a front seat when no passenger is seated on the rear seat, wherein the amount of outdoor air in the air mixture is smaller than the amount of indoor air. Partial indoor air which is a part of the indoor air moved with the flow of the outdoor air may be transferred to the front seat in order to improve heating efficiency of the front seat.

BRIEF DESCRIPTION OF THE DRAWINGS

FIG. 4 is a table for describing steps for controlling an inlet door according to a heating mode, in FIG. 3.

DESCRIPTION OF SPECIFIC EMBODIMENTS

Hereafter, a method for controlling an air conditioner of a vehicle in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
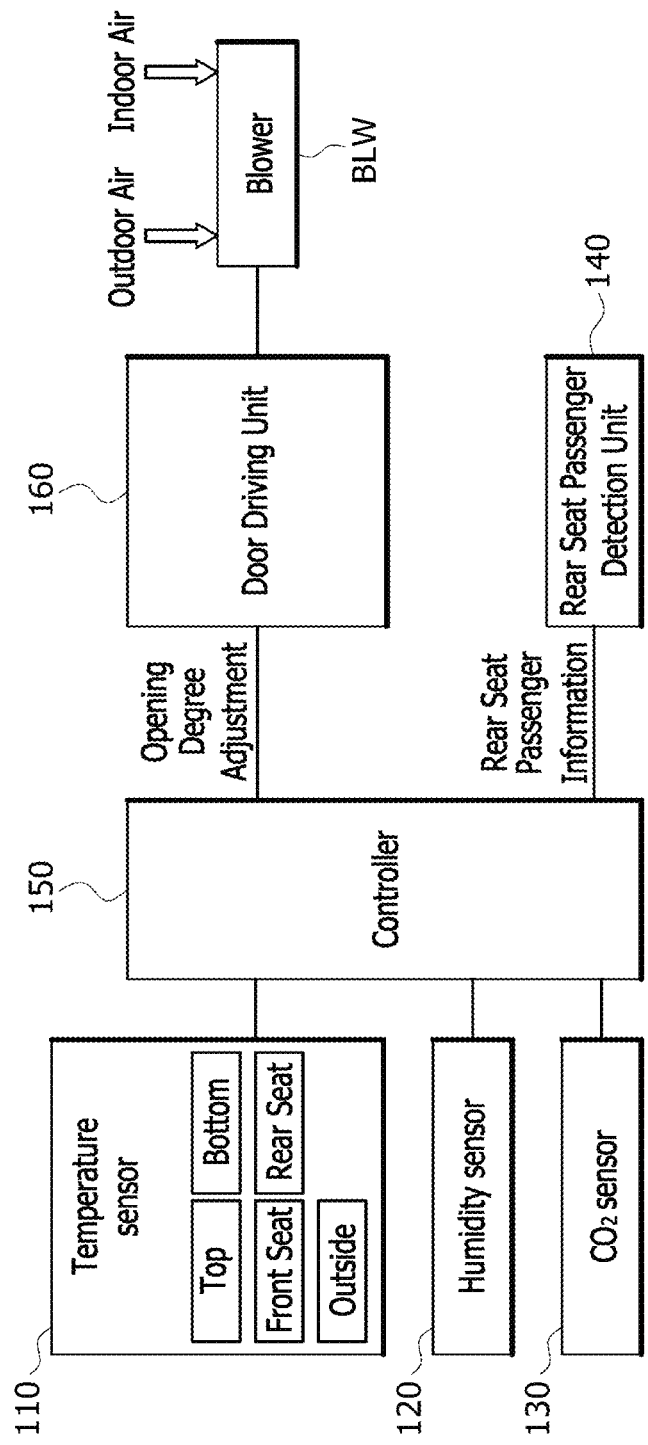
FIG. 1 is a diagram illustrating a schematic configuration of an air conditioner control device for a vehicle in accordance with an embodiment of the present invention.

FIG. 1 illustrates a schematic configuration of an air conditioner control device for a vehicle in accordance with an embodiment of the present invention.

As illustrated in FIG. 1, the air conditioner control device for a vehicle in accordance with the embodiment of the present invention may include a temperature sensor 110, a humidity sensor 120, a $CO_2$ sensor 130, a rear seat passenger sensor 140, a controller 150, a door driving unit 160 and a blower BLW.

The temperature sensor 110 may include one or more temperature sensors for detecting temperatures of the inside and outside of the vehicle.

The temperature sensor 110 may detect one or more of a top temperature, a bottom temperature, a front seat temperature and a rear seat temperature as the temperature of the inside of the vehicle.

Although not illustrated in detail in the drawings, outside temperature data (outside temperature information) such as temperature information for each city or region may be received as the outside temperature from a designated server (not illustrated).

The humidity sensor 120 may include one or more humidity sensors for detecting the indoor humidity of the vehicle.

The humidity sensor 120 may include one or more humidity sensors for detecting the outdoor or indoor humidity of the vehicle.

The $CO_2$ sensor 130 may include one or more $CO_2$ sensors for detecting the outdoor or indoor $CO_2$ concentration of the vehicle.

The rear seat passenger sensor 140 may detect whether a passenger (occupant) is seated on a rear seat of the vehicle. In order to detect the passenger (or occupant) in the rear seat, the rear seat passenger sensor 140 may receive a seat belt fastening signal, a seating pressure sensor signal or a child seat sensor signal from an electronic controller (ECU) of the vehicle, detect whether a passenger is seated on the rear seat, according to a rear seat window operation signal and a rear seat control signal, or use a signal detected through a separate sensor (for example, an IR sensor or ultrasonic sensor).

The controller 150 may combine mode setting information and the information detected through the respective units 110 to 140, and control an intake door (or inlet door) of the blower BLW in a stepwise manner, depending on a detailed heating state of the vehicle (for example, outdoor air setting, an extreme cold state, temperature setting for outside temperature, maximum heating setting or a rear seat passenger state).

The door driving unit 160 may comprise motors and/or actuator and adjust the ratio of outdoor air to indoor air by driving doors of the blower BLW (or a plurality of inlet doors and outlet doors) according to control of the controller 150.

Figure 2:
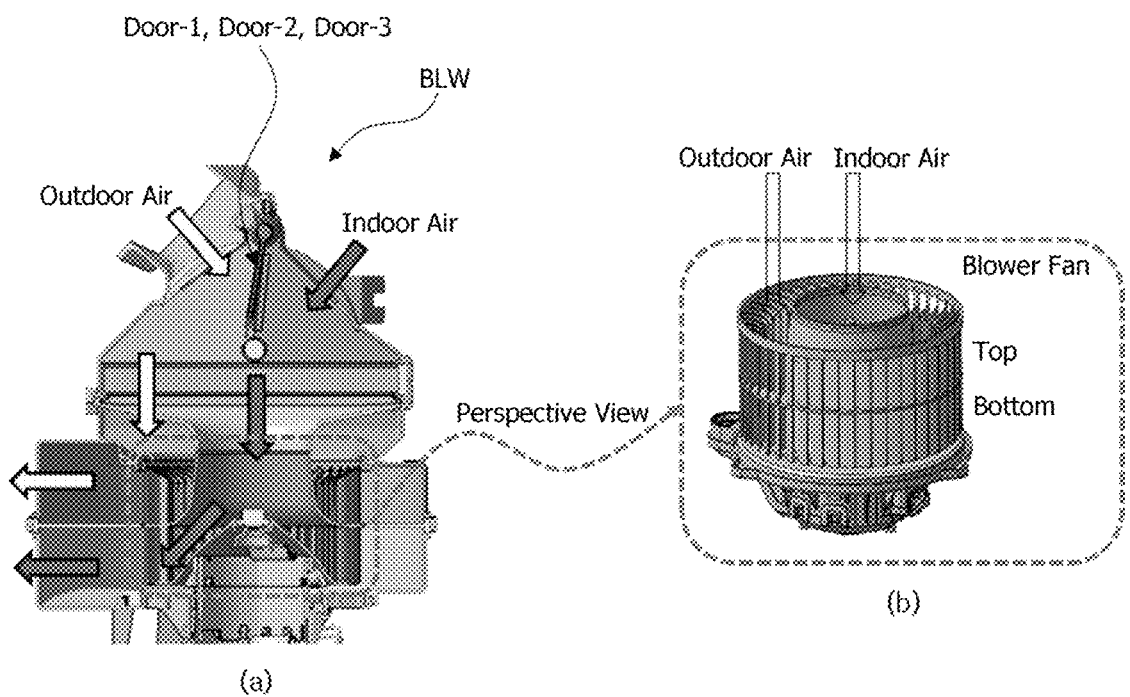
FIG. 2 illustrates a general blower with a 2-layer structure in FIG. 1.

FIG. 2 illustrates the general blower with a 2-layer structure in FIG. 1. The structure illustrated in FIG. 2 is only used to promote understandings of the 2-layer structure, and not limit the structure of a blower fan in accordance with the present embodiment.

For reference, the blower fan of the blower BLW with a 2-layer structure may have a structure divided into upper and lower parts. For example, air inlets may be formed in the circumferential direction or top-to-bottom direction, and air outlets may be connected to the air inlets. The blower fan may discharge air (indoor air) introduced through an inner channel (air channel) to the bottom, and discharge air (outdoor air) introduced through an outer channel to the top. The method for controlling an air conditioner for a vehicle in accordance with the embodiment of the present invention can be applied to not only the general blower with a 2-layer structure, but also blower fans of all blowers (or blower modules) which have a plurality of inlet doors and a plurality of outlet doors.

Hereafter, the operation of the controller 150 will be described in detail with reference to a flowchart of FIG. 3.

Figure 3:
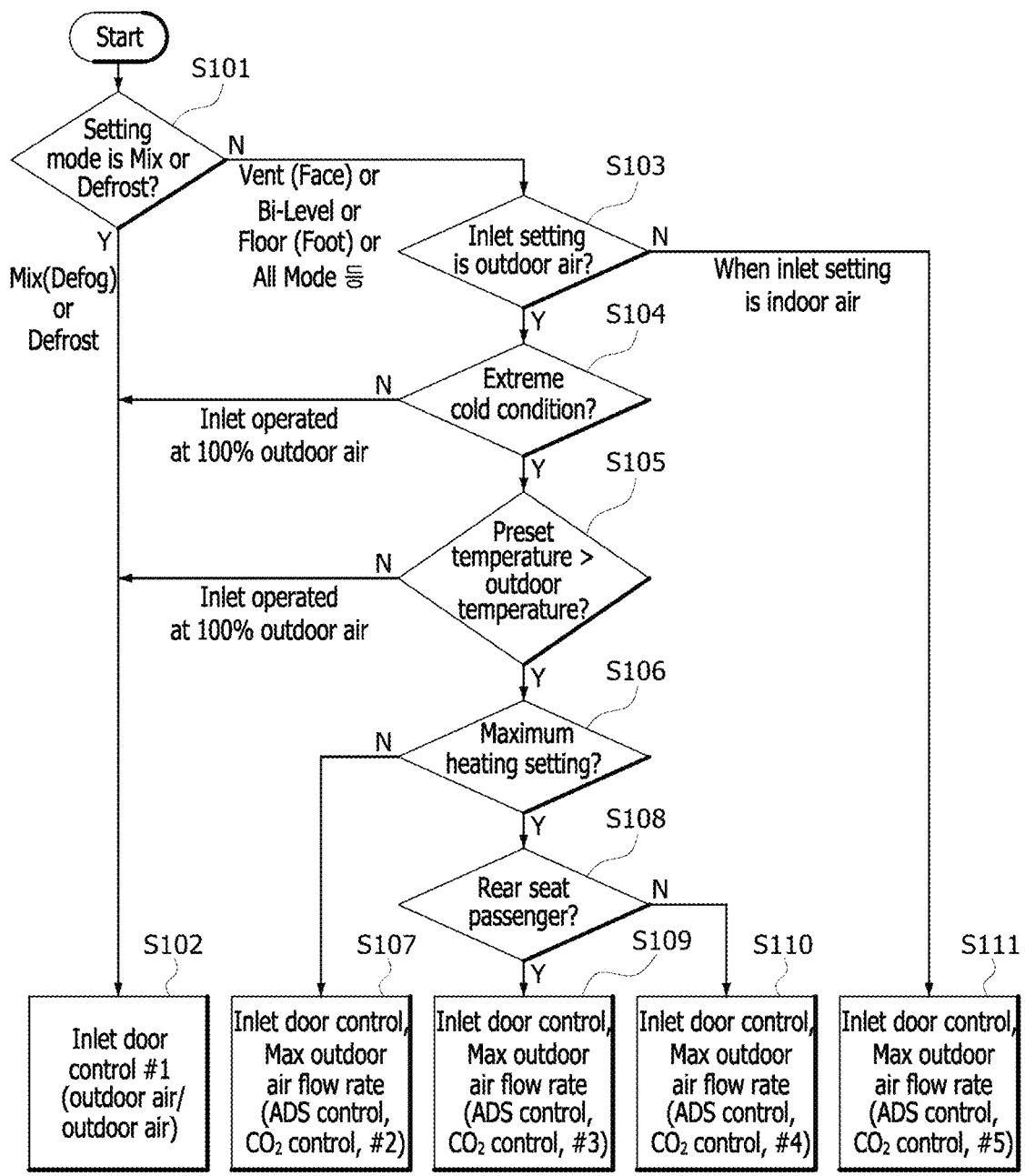
FIG. 3 is a flowchart for describing a method for controlling an air conditioner of a vehicle in accordance with an embodiment of the present invention.

FIG. 3 is a flowchart for describing the method for controlling an air conditioner for a vehicle in accordance with the embodiment of the present invention.

Referring to FIG. 3, the controller 150 may check whether the current mode of the blower is a mix/defog mode, a defrost mode or another mode, at step S101.

When the check result of step S101 indicates that the current mode of the blower is the mix/defog mode or the defrost mode (Y at step S101), the controller 150 may perform inlet door control according a first step #1 (refer to FIG. 4), at step S102.

FIG. 4 is a table for describing steps for performing the inlet door control according to a heating mode, in FIG. 3.

Referring to FIG. 4, the inlet door control of the first step #1 is to introduce and discharge outdoor air through the top and bottom of the blower fan.

When the check result of step S101 indicates that the current mode of the blower is not the mix/defog mode or the defrost mode, but another mode (for example, vent (face), bi-level, floor (foot) or all mode) (N at step S101), the controller 150 may check whether the intake setting is set to outdoor air, at step S103.

When the check result of step S103 indicates that the intake is set to indoor air (N at step S103), the controller 150 may perform the inlet door control according to a fifth step #5 (refer to FIG. 4), at step S111.

Referring to FIG. 4, the inlet door control of the fifth step #5 is to introduce and discharge indoor air through the top and bottom of the blower fan.

On the other hand, when the check result of step S103 indicates that the intake is set to outdoor air (Y at step S103), the controller 150 may check whether the current outside temperature corresponds to the extreme cold condition, at step S104.

The extreme cold condition may indicate that the outside temperature is equal to or lower than a first temperature (for example, −10° C.). When the outdoor air is equal to or higher than a second temperature (for example, −7° C.) after entering the extreme cold condition, the extreme cold condition may be canceled. However, the first and second temperatures may not be limited.

When the check result of step S104 indicates that the current outside temperature does not correspond to the extreme cold condition (N at step S104), the controller 150 may perform the inlet door control according to the first step #1 (refer to FIG. 4), at step S102. That is, since the intake is set to outdoor air at step S103, the outdoor air may be introduced and discharged through both of the top and bottom of the blower fan.

On the other hand, when the check result of step S104 indicates that the current outside temperature corresponds to the extreme cold condition (Y at step S104), the controller 150 may determine whether the preset temperature is higher than the current outside temperature, at step S105.

When the comparison result of step S105 indicates that the outside temperature is higher than the preset temperature (N at step S105), the controller 150 may perform the inlet door control according to the first step #1 (refer to FIG. 4), at step S102. That is, since the outside temperature is higher than the preset temperature even though the 100% outdoor air is introduced to the inside, the outdoor air may be introduced and discharged through both of the top and bottom of the blower fan.

However, when the comparison result of step S105 indicates that the outside temperature is not higher than the preset temperature (Y at step S105) or the preset temperature is equal to or higher than the outside temperature, the controller 150 may check whether the current heating state is set to the maximum heating, at step S106.

The maximum heating may indicate that the preset temperature is equal to or higher than a third temperature (for example, 23° C.), and cooling water temperature is equal to or lower than a fourth temperature (for example, 70° C.). However, the third and fourth temperatures may not be limited.

When the check result of step S106 indicates that the current heating state is not set to the maximum heating (N at step S106), the controller 150 may perform the inlet door control according to a second step #2 (refer to FIG. 4) at step S107.

Referring to FIG. 4, the inlet door control of the second step #2 is to introduce and discharge only outdoor air through the top of the blower fan while introducing and discharging only indoor air through the bottom of the blower fan, in order to circulate the indoor air. That is, since the current heating state is not the maximum heating, but heating is required under the extreme cold condition, the outdoor air discharge and the heating may be performed at the same time.

When the check result of step S106 indicates that the current heating state is set to the maximum heating (Y at step S106), the controller 150 may check whether a passenger is seated on the rear seat, at step 108.

When the check result of step S108 indicates that a passenger is seated on the rear seat (Y at step S108), the controller 150 may perform the inlet door control according to a third step #3 (refer to FIG. 4) at step S109.

Referring to FIG. 4, the inlet door control of the third step #3 is to introduce and discharge an air mixture of indoor air and outdoor air through the top of the blower fan, while introducing and discharging only the indoor air through the bottom of the blower fan. At this time, the ratio of the outdoor air in the air mixture may be higher than the ratio of the indoor air (outdoor air>indoor air). That is, in order to improve the heating performance, the air mixture may be introduced and discharged through the top of the blower fan. At this time, the ratio of the outdoor air in the air mixture may be set to a higher value than the ratio of the indoor air, such that heated air can reach the passenger in the rear seat according to the characteristic of the outdoor air flow ventilated to the outside through the rear seat of the vehicle (refer to FIG. 5).

At this time, the controller 150 may check whether a passenger is seated on the rear seat, using one or more pieces of information on whether the rear seat belt is fastened, whether a seating pressure sensor signal is detected, whether a child seat sensor signal is detected, whether a passenger in the rear seat is detected through a separate infrared sensor, whether a rear seat window switch is adjusted, and whether the rear seat is adjusted. Furthermore, the controller 150 may check whether a passenger is seated on the rear seat, depending on whether a signal sensed through a separately installed sensor (for example, IR sensor or ultrasonic sensor) is a fail. For example, when the signal is fail, the controller 150 may determine that the passenger is seated on the rear seat.

Figure 5:
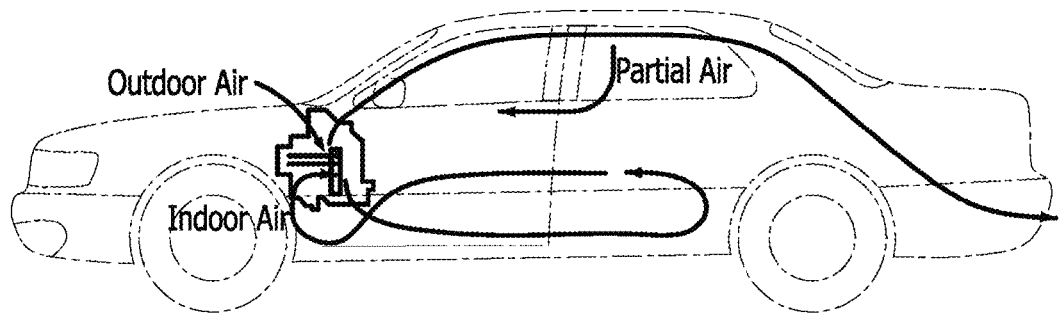
FIG. 5 illustrates the principle to improve the heating efficiency of a rear or front seat by adjusting the ratio of indoor air to outdoor air when the indoor air and the outdoor air are mixed, in FIG. 3.

FIG. 5 illustrates the principle to improve the heating efficiency of the rear or front seat by adjusting the ratio of indoor air to outdoor air when the indoor air and the outdoor air are mixed, in FIG. 3. Referring to FIG. 5, heated air may be introduced from the front of the vehicle, moved toward the rear of the vehicle along the upper part of the vehicle or the ceiling and the head of the passenger, and then discharged to the outside. Therefore, when the amount of outdoor air is controlled to be larger than the amount of indoor air in the air mixture of the outdoor air and the indoor air (that is, during the control of the third step #3), the indoor air may be moved to the rear seat with the outdoor air while partial indoor air (part of the indoor air which is mixed with the flow of outdoor air and moved) is reduced. Thus, the heating efficiency of the rear seat can be improved.

When the check result of step S108 indicates that no passenger is seated on the rear seat (N at step S108), the controller 150 may perform the inlet door control according to the fourth step #4 (refer to FIG. 4) at step S110.

Referring to FIG. 4, the inlet door control of the fourth step #4 is to introduce and discharge an air mixture through the top of the blower fan while introducing and discharging only indoor air through the bottom of the blower fan. At this time, the ratio of the indoor air in the air mixture may be equal to or more than the ratio of the outdoor air (outdoor air≤indoor air). That is, in order to improve the heating performance, the air mixture may be introduced and discharged through the top of the blower fan. However, since the heated air does not need to reach the rear seat, the air mixture in which the ratio of the indoor air is equal to or more than the ratio of the outdoor air may be introduced and discharged (refer to FIG. 5).

Referring to FIG. 5, the outdoor air may be introduced from the front of the vehicle, moved along the ceiling toward the rear of the vehicle, and discharged to the outside. Therefore, when the amount of outdoor air is smaller than the amount of indoor air in the air mixture of the outdoor air and the indoor air (that is, during the control of the fourth step #4), the indoor air may not be moved to the rear seat, while partial indoor air (part of the indoor air which is mixed with the flow of outdoor air and moved) is increased. Thus, the heating efficiency of the front seat can be improved.

Figure 6:
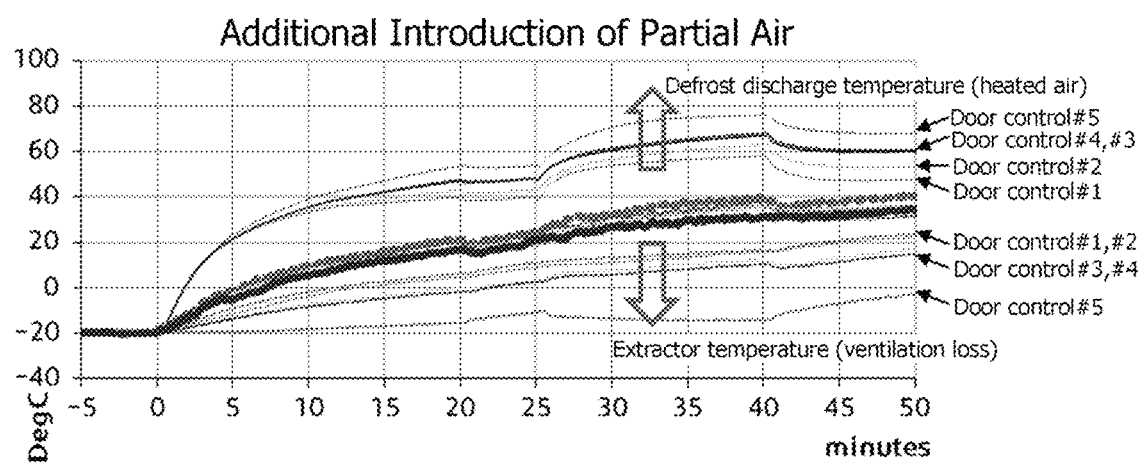
FIG. 6 is a graph illustrating a discharge temperature of heated air for each inlet door control step and an extractor temperature by a ventilation loss, in FIG. 3.

FIG. 6 is a graph illustrating a discharge temperature of heated air for each inlet door control step and an extractor temperature by a ventilation loss. As illustrated in FIG. 6, the ventilation loss increases and the discharge temperature falls toward the first step #1 in which the amount of outdoor air is high, and the ventilation loss decreases and the discharge temperature rises toward the fifth step #5 in which the amount of outdoor air is low.

In particular, when the inlet door control is performed according to the third and fourth steps #3 and #4 in which partial indoor air (part of the indoor air which is mixed with the flow of outdoor air and moved) is additionally introduced while the air mixture of the outdoor air and the indoor air is discharged through the top of the blower fan, the heating efficiency can be improved further than the existing method in which only outdoor air is discharged through the top of the blower fan.

Figure 7:
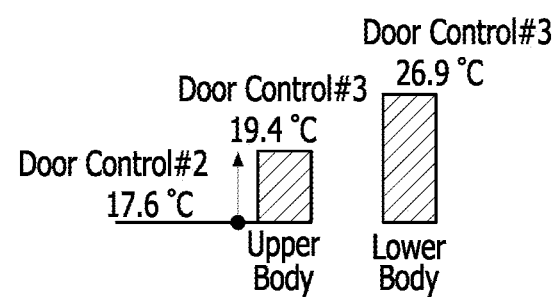
FIG. 7 illustrates a heating effect when the inlet door is controlled according to steps in which partial indoor air is additionally introduced, in FIG. 3.

FIG. 7 illustrates the heating effect when the inlet door control is performed according to the steps in which partial indoor air (part of the indoor air which is mixed with the flow of outdoor air and moved) is additionally introduced, in FIG. 3. FIG. 7 comparatively shows the top temperature (for example, 17.6° C.) when the inlet door control is performed according to the second step #2 in which partial indoor air is not additionally introduced and the top temperature (for example, 19.4° C.) when the inlet door control is performed according to the third step #3 in which partial indoor air is additionally introduced. Referring to FIG. 7, when the inlet door control is performed according to the third step #3 in which partial indoor air is additionally introduced, the top temperature may be raised by about 2° C.

For reference, the amounts of outdoor air introduced at the respective inlet door control steps #1 to #5 may have a relation of (first step #1>second step #2>third step #3>fourth step #4>fifth step #5). The increase in amount of outdoor air may improve the defog and $CO_2$ ventilation performance, but degrade the heating performance.

Therefore, in the second to fifth steps #2 to #5 excluding the first step #1 in which only outdoor air is introduced, ADS (Auto Defog System) control and $CO_2$ control (or $CO_2$ concentration control) need to be additionally performed.

Figure 8:
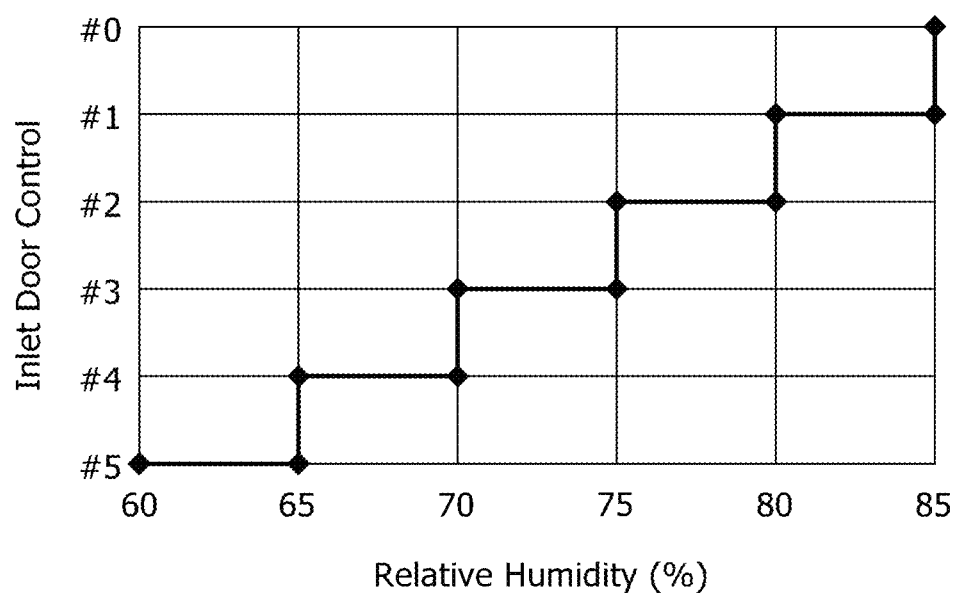
FIG. 8 is a graph for describing a humidity control method for each inlet door control step, in order to prevent condensation of moisture on the window, in FIG. 3.

FIG. 8 is a graph for describing a humidity control method for each inlet door control step, in order to prevent condensation of moisture on the window, in FIG. 3. As illustrated in FIG. 8, the indoor humidity of the vehicle may be divided into one or more sections. In a section where the humidity is high, the inlet door control may be performed in order from the first step #1 of the inlet door control, in which the amount of outdoor air is high. In a second where the humidity is low, the inlet door control may be performed in order from the fifth step #5 of the inlet door control, in which the amount of outdoor air is low.

Figure 9:
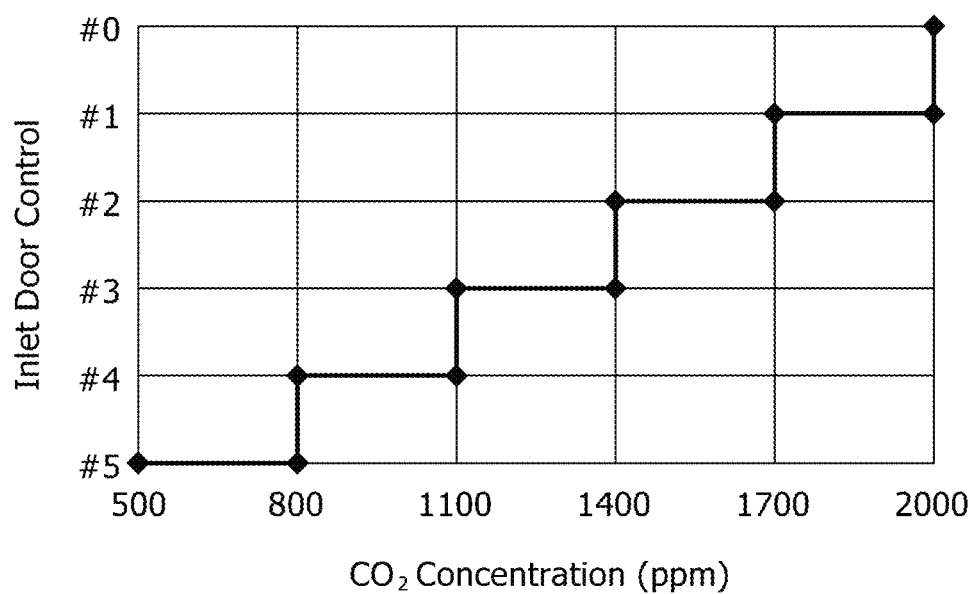
FIG. 9 is a graph for describing the inlet door control steps depending on $CO_2$ concentration, in FIG. 3.

FIG. 9 is a graph for describing the inlet door control steps depending on $CO_2$ concentration, in FIG. 3. As illustrated in FIG. 9, the $CO_2$ concentration of the vehicle may be divided into one or more sections. In a second where the $CO_2$ concentration is high, the inlet door control may be performed in order from the first step #1 of the inlet door control, in which the amount of outdoor air is high. In a section where the $CO_2$ concentration is low, the inlet door control may be performed in order from the fifth step #5 of the inlet door control, in which the amount of outdoor air is low.

Figure 10:
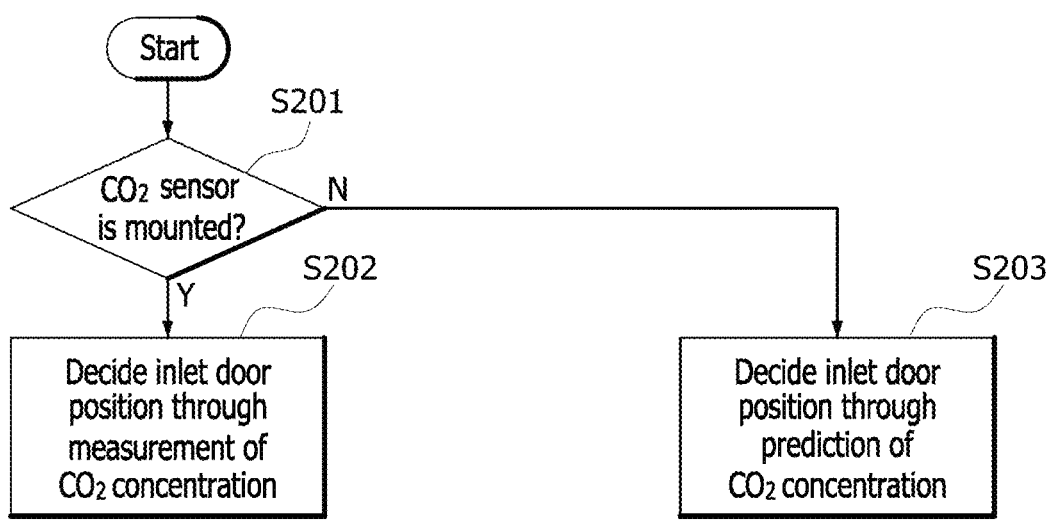
FIG. 10 is a diagram for describing an inlet door control method depending on a whether a $CO_2$ sensor is mounted, in FIG. 9.

FIG. 10 is a diagram for describing the inlet door control method depending on whether the $CO_2$ sensor is mounted, in FIG. 9. As illustrated in FIG. 10, when the $CO_2$ sensor 130 (for example, $CO_2$ sensor) is mounted in the vehicle (Y at step S201), the $CO_2$ sensor 130 (for example, $CO_2$ sensor) may detect $CO_2$ concentration, and perform the inlet door control for each step as illustrated in FIG. 9, at step S202.

However, when the $CO_2$ sensor 130 (for example, $CO_2$ sensor) is not mounted in the vehicle (N at step S201), the controller 150 may predict $CO_2$ concentration and perform the inlet door control for each step at step S203.

For example, the controller 150 may predict the $CO_2$ concentration by referring to a $CO_2$ concentration table derived through a $CO_2$ concentration measurement experiment based to the vehicle speed (or engine RPM) and traveling time, or using a preset $CO_2$ concentration approximate expression based on the vehicle speed (or engine RPM) and traveling time.

In accordance with the embodiment of the present invention, the control method can control the blower inlet door of the air conditioner in a stepwise manner depending on a detailed heating state, thereby minimizing heat ventilated to the outside of the vehicle and increasing the average indoor temperature and the thermal sensation of the upper part of the passenger. Furthermore, the control method can reduce power consumption for heating, thereby improving the fuel efficiency. Furthermore, the control method can properly control moisture on the window and $CO_2$ concentration which may occur when excessive indoor air is continuously circulated. Therefore, it is possible to maintain the indoor air quality of the vehicle while securing a view for safe driving.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for controlling an air conditioner for heating indoor of a vehicle, the method comprising:
    providing a blower that comprises a plurality of inlets for introducing outdoor air and indoor air and a plurality of outlets for discharging the introduced outdoor air and the introduced indoor air, wherein the plurality of outlets comprise a top outlet and a bottom outlet, wherein the blower is configured to control air flow in the blower such that either of the introduced outdoor air and the introduced indoor air is discharged through the bottom outlet, wherein the blower is further configured to control air flow in the blower such that both or either of the introduced outdoor air and the introduced indoor air is discharged through the top outlet; and
    detecting an outside temperature;
    controlling the blower to:
        discharge the introduced outdoor air through both the top and bottom outlets, when the outside temperature is greater than a preset target temperature and the outside temperature is greater than a first predetermined temperature which is below zero Celsius degree,
        discharge only the introduced outdoor air through the top outlet and discharge only the introduced indoor air through the bottom outlet, when the outside temperature is smaller than the preset target temperature and the air conditioner is not in a maximum heating mode in which the preset target temperature is greater than a second predetermined temperature and a cooling water temperature is equal to or lower than a third predetermined temperature, and
        discharge an air mixture of the introduced outdoor air and the introduced indoor air through the top outlet and discharge only the introduced indoor air through the bottom outlet, when the outside temperature is smaller than the preset target temperature and the air conditioner is in the maximum heating mode.

2. The method of claim 1, wherein when discharging the air mixture of the introduced outdoor air and the introduced indoor air,
    a ratio of the introduced outdoor air in the air mixture is larger than that of the introduced indoor air when a passenger is seated on a rear seat; and
    a ratio of the introduced indoor air in the air mixture is equal to or larger than the ratio that of the introduced outdoor air when no passenger is seated on the rear seat.

3. The method of claim 2, wherein it is determined whether the passenger is seated on the rear seat, using one or more of whether a rear seat belt is fastened, whether a seating pressure sensor signal is detected, whether a child seat sensor signal is detected, whether the passenger is seated on the rear seat through an infrared sensor, whether a rear seat window switch is adjusted, and whether the rear seat is adjusted.

4. A method for controlling an air conditioner for a vehicle, which includes a blower having a structure divided into a plurality of inlets and a plurality of outlets, the method comprising:
    checking, by a controller, whether a passenger is seated on a rear seat, when the vehicle is in heater on status; and
    controlling, by the controller, an inlet door by introducing and discharging indoor air through the bottom of a blower fan and introducing and discharging an air mixture of outdoor air and indoor air through the top of the blower fan, in order to improve heating efficiency of the rear seat when the passenger is seated on the rear seat, wherein the amount of outdoor air in the air mixture is larger than the amount of indoor air,
    wherein partial indoor air which is a part of the indoor air moved with the flow of the outdoor air is transferred to the rear seat in order to improve heating efficiency of the rear seat.

5. A method for controlling an air conditioner for a vehicle, which includes a blower having a structure divided into a plurality of inlets and a plurality of outlets, the method comprising:
    checking, by a controller, whether a passenger is seated on a rear seat, when the vehicle is in heater on status; and
    controlling, by the controller, an inlet door by introducing and discharging indoor air through the bottom of a blower fan and introducing and discharging an air mixture of outdoor air and indoor air through the top of the blower fan, in order to improve heating efficiency of a front seat when no passenger is seated on the rear seat, wherein the amount of outdoor air in the air mixture is smaller than the amount of indoor air,
    wherein partial indoor air which is a part of the indoor air moved with the flow of the outdoor air is transferred to the front seat in order to improve heating efficiency of the front seat.

* * * * *